United States Patent
Cheng et al.

(10) Patent No.: US 11,343,809 B2
(45) Date of Patent: *May 24, 2022

(54) METHODS AND RELATED DEVICES OF CHANNEL STATE INFORMATION (CSI) REPORTING FOR BANDWIDTH PART (BWP) SWITCH OPERATION

(71) Applicant: FG Innovation Company Limited, Tuen Mun (HK)

(72) Inventors: Chien-Chun Cheng, Taipei (TW); Chie-Ming Chou, Taipei (TW); Yu-Hsin Cheng, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/000,179

(22) Filed: Aug. 21, 2020

(65) Prior Publication Data
US 2020/0389889 A1  Dec. 10, 2020

Related U.S. Application Data

(63) Continuation of application No. 16/365,712, filed on Mar. 27, 2019, now Pat. No. 10,798,689.

(Continued)

(51) Int. Cl.
*H04W 72/04* (2009.01)
*H04L 5/00* (2006.01)

(52) U.S. Cl.
CPC ....... *H04W 72/0413* (2013.01); *H04L 5/0053* (2013.01); *H04W 72/0453* (2013.01)

(58) Field of Classification Search
CPC .......... H04W 72/0413; H04W 72/0453; H04L 5/0053
See application file for complete search history.

(56) References Cited

U.S. PATENT DOCUMENTS 10,477,457 B2 * 11/2019 Park ................... H04L 5/1469
2018/0367386 A1 * 12/2018 Liao ................... H04L 5/0092
(Continued)

FOREIGN PATENT DOCUMENTS

EP    3723321 A1    10/2020

OTHER PUBLICATIONS

Vivo, "Remaining issues on CSI reporting", R1-1801519, 3GPP TSG RAN WG1 Meeting #92, Athens, Greece, Feb. 26-Mar. 2, 2018.
(Continued)

*Primary Examiner* — Fahmida S Chowdhury
(74) *Attorney, Agent, or Firm* — ScienBiziP, P.C.

(57) ABSTRACT

A method for Channel State Information (CSI) reporting includes a User Equipment (UE) receiving a Channel State Information (CSI) reporting configuration from a base station (BS) on a first Bandwidth Part (BWP), receiving a first BWP switch indication from the BS on the first BWP, switching an active BWP of the UE from the first BWP to a second BWP, reserving the CSI reporting configuration after switching the active BWP, receiving a second BWP switch indication on the second BWP or a third BWP after switching the active BWP, switching the active BWP back to the first BWP, and automatically sending a CSI report based on the CSI reporting configuration without receiving any CSI reporting activation command from the BS after switching the active BWP back to the first BWP.

8 Claims, 14 Drawing Sheets

Related U.S. Application Data

(60) Provisional application No. 62/652,766, filed on Apr. 4, 2018.

(56) References Cited

U.S. PATENT DOCUMENTS

| | | | | |
|---|---|---|---|---|
| 2019/0053029 A1* | 2/2019 | Agiwal | ................. | H04W 48/12 |
| 2019/0141546 A1* | 5/2019 | Zhou | ................. | H04W 72/0413 |
| 2019/0149305 A1* | 5/2019 | Zhou | ..................... | H04L 5/0055 |
| | | | | 370/330 |
| 2019/0207662 A1* | 7/2019 | Zhou | .................. | H04W 72/042 |
| 2019/0254114 A1* | 8/2019 | Son | ........................ | H04L 5/001 |

OTHER PUBLICATIONS

Vivo, "Other aspects on bandwidth Parts", R1-1719800, 3GPP TSG RAN WG1 Meeting 91, Reno, USA, Nov. 27-Dec. 1, 2017.

MTI, "Remaining details on CSI Reporting", R1-1804499, 3GPP TSG-RAN WG1 #92-Bis, Sanya, China, Apr. 16-20, 2018.

AT&T, "Several remaining details on aperiodic CSI report", R1-1800581, 3GPP TSG RAN WG1 Meeting AH 1801, Vancouver, Canada, Jan. 22-26, 2018.

Fricsson, "Summary of CSI reporting v3", R1-1803301, 33GPP TSG RAN WG1 Meeting #92, Athens, Greece, 26th Feb.-Mar. 2, 2018.

* cited by examiner

METHODS AND RELATED DEVICES OF CHANNEL STATE INFORMATION (CSI) REPORTING FOR BANDWIDTH PART (BWP) SWITCH OPERATION

CROSS-REFERENCE TO RELATED APPLICATION(S)

This application is a continuation application of U.S. patent application Ser. No. 16/365,712 ("the '712 application"), filed on Mar. 27, 2019, which claims the benefit of and priority to a provisional U.S. Patent Application Ser. No. 62/652,766 ("the '766 provisional"), filed on Apr. 4, 2018, entitled "Method and apparatus for SP-CSI reporting on PUSCH for BWP switch." The contents of the '712 application and the '766 provisional are fully incorporated by reference for all purposes.

FIELD

The present disclosure generally relates to wireless communications, and more particularly, to methods and related devices of Channel State Information (CSI) reporting for a Bandwidth Part (BWP) switch operation.

BACKGROUND

Various efforts have been made to improve different aspects of wireless communications, such as data rate, latency, reliability and mobility, for the next generation (e.g., 5G New Radio (NR)) wireless communication systems. Among the new concepts in the next generation wireless communication systems, a BWP is a contiguous set of Physical Resource Blocks (PRBs) on a given carrier. With of the introduction of BWP, a User Equipment (UE) may not need to monitor the entire bandwidth of a wideband carrier.

CSI reporting mechanism may also be used in next generation wireless communication systems to increase the reliability of a communications link. For example, a UE may generate a CSI report based on the channel conditions measured/observed by the UE, and transmit the CSI report to a base station.

However, in NR, the base station may trigger a BWP switch operation to switch the UE's active BWP from one to another. The CSI reporting operation in the current wireless communication systems may not be adequate if a BWP switch operation occurs while a CSI reporting operation is ongoing.

Therefore, there is a need in the art for an improved CSI reporting mechanism to be compatible with the BWP switch operation in the next generation wireless communication systems.

SUMMARY

The present disclosure is directed to methods and related devices of CSI reporting for BWP switch operations.

According to an aspect of the present disclosure, a method performed by a UE for reporting CSI is provided. The method includes the UE receiving a CSI reporting configuration from a base station on a first BWP, receiving a first BWP switch indication from the base station (BS) on the first BWP, switching an active BWP of the UE from the first BWP to a second BWP according to the first BWP switch indication, reserving the CSI reporting configuration after switching the active BWP, receiving a second BWP switch indication on the second BWP or a third BWP after switching the active BWP, switching the active BWP back to the first BWP according to the second BWP switch indication, and automatically sending a CSI report based on the CSI reporting configuration without receiving any CSI reporting activation command from the BS after switching the active BWP back to the first BWP.

According to another aspect of the present disclosure, a UE is provided. The UE includes a memory and at least one processor coupled to the memory. The at least one processor is configured to receive a CSI reporting configuration from a base station (BS) on a first BWP, receive a first BWP switch indication from the BS on the first BWP, switch an active BWP of the UE from the first BWP to a second BWP according to the first BWP switch indication, reserve the CSI reporting configuration after switching the active BWP, receive a second BWP switch indication on the second BWP or a third BWP after switching the active BWP, switch the active BWP back to the first BWP according to the second BWP switch indication, and automatically send a CSI report based on the CSI reporting configuration without receiving any CSI reporting activation command from the BS after switching the active BWP back to the first BWP.

BRIEF DESCRIPTION OF THE DRAWINGS

Aspects of the exemplary disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
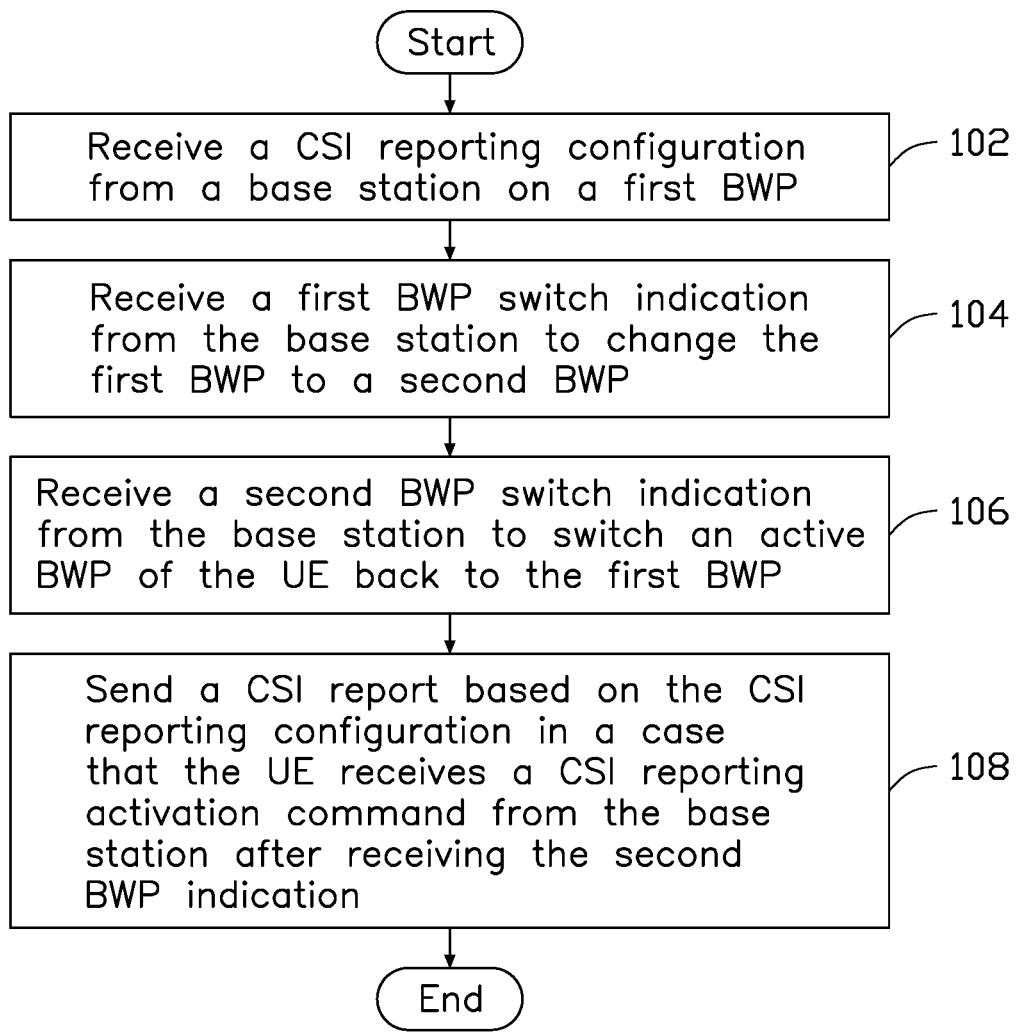
FIG. 1 illustrates a flowchart for a method of CSI reporting for a BWP switch operation, in accordance with example implementations of the present disclosure.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of Applications Specific Integrated Circuitry (ASIC), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, or an LTE-Advanced Pro system) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access Network (E-UTRAN), a Next-Generation Core (NGC), or an internet) through a radio access network (RAN) established by the base station.

It should be noted that, in the present application, a UE may include, but is not limited to, a mobile station, a mobile terminal or device, a user communication radio terminal, etc. For example, a UE may be a portable radio equipment, which includes, but is not limited to, a mobile phone, a tablet, a wearable device, a sensor, or a Personal Digital Assistant (PDA) with wireless communication capability. The UE is configured to receive/transmit signals over an air interface from/to one or more cells in a radio access network.

A base station may include, but is not limited to, a node B (NB) as in the UMTS, an evolved node B (eNB) as in the LTE-A, a radio network controller (RNC) as in the UMTS, a base station controller (BSC) as in the GSM/GERAN, an NG-eNB as in an E-UTRA base station in connection with the 5GC, a next generation node B (gNB) as in the 5G-AN, and any other apparatus capable of controlling radio communication and managing radio resources within a cell. The base station may connect to serve the one or more UEs through a radio interface to the network.

A base station may be configured to provide communication services according to at least one of the following Radio Access Technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic Wideband-Code Division Multiple Access (W-CDMA), High-Speed Packet Access (HSPA), LTE, LTE-A, eLTE (evolved LTE), New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate SideLink (SL) resources for supporting Proximity Service (ProSe). Each cell may have overlapped coverage areas with other cells.

As discussed above, the frame structure for NR is to support flexible configurations for accommodating various next generation (e.g., 5G) communication requirements, such as enhanced Mobile BroadBand (eMBB), massive Machine Type Communication (mMTC), Ultra-Reliable communication and Low Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP), may also be used. Additionally, two coding schemes are considered for NR: (1) Low-Density Parity-Check (LDPC) code and (2) polar code. The coding scheme adaption may be configured based on the channel conditions and/or the service applications.

Moreover, it should be noted that in a transmission time interval TX of a single NR frame, at least DownLink (DL) transmission data, a guard period, and UpLink (UL) transmission data should be included. Additionally, the respective portions of the DL transmission data, the guard period, and the UL transmission data should also be configurable, for example, based on the network dynamics of NR. In addition, SL resource may also be provided in an NR frame to support ProSe services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, and B exists alone. In addition, the character "/" herein generally represents that the former and latter associated objects are in an "or" relationship.

In NR, Semi-Persistent (SP) CSI reporting mechanism is introduced. The SP-CSI reporting mechanism may help save overhead of control channels by doing minimum DL assignment and UL grant. In some of the present implementations, the SP-CSI reporting procedure may include the following three stages: 1) the UE is configured with a set of trigger states by a base station via the Radio Resource Control (RRC) signaling, 2) the UE receives a CSI reporting activation command (e.g., (SP-CSI) DCI for activation) from the base station to activate one of the trigger states, and 3) the UE receives a CSI reporting deactivation command (e.g., (SP-CSI) DCI for deactivation) to deactivate one of the trigger states.

In some implementations, the SP-CSI reporting procedure may continue with a dynamic DL BWP switch operation. The BWP switch operation may happen during the active period of the SP-CSI reporting procedure.

FIG. 1 illustrates a flowchart for a method of CSI reporting for a BWP switch operation, in accordance with example implementations of the present disclosure. As shown in FIG. 1, the flowchart includes actions 102, 104, 106 and 108.

In action 102, a UE may receive a CSI reporting configuration (e.g., the "CSI-ReportConfig" Information Element (IE)) from a base station on a first BWP. In some implementations, the CSI reporting configuration may be contained in an RRC message (e.g., an RRC configuration message) received from the base station. In some of such implementations, the RRC message may include a plurality of trigger states, and one of the plurality of trigger states may be associated with the CSI reporting configuration. For example, the trigger state may be configured by a higher layer parameter (e.g., the "CSI-SemiPersistentOnPUSCH-TriggerState" IE). The higher layer parameter may include, for example, an Identity (ID) of the CSI reporting configuration (e.g., the "CSI-ReportConfigId" IE).

In action 104, the UE may receive a first BWP switch indication from the base station to change the first BWP to a second BWP.

In action 106, the UE may receive a second BWP switch indication from the base station to switch an active BWP of the UE back to the first BWP.

In action 108, the UE may send a CSI report based on the CSI reporting configuration in a case that the UE receives a CSI reporting activation command from the base station after receiving the second BWP indication. In some implementations, the CSI reporting activation command may include an indication of the trigger state associated with the CSI reporting configuration. The base station may send the CSI reporting activation command to the UE to select the trigger state for CSI reporting.

Figure 2:
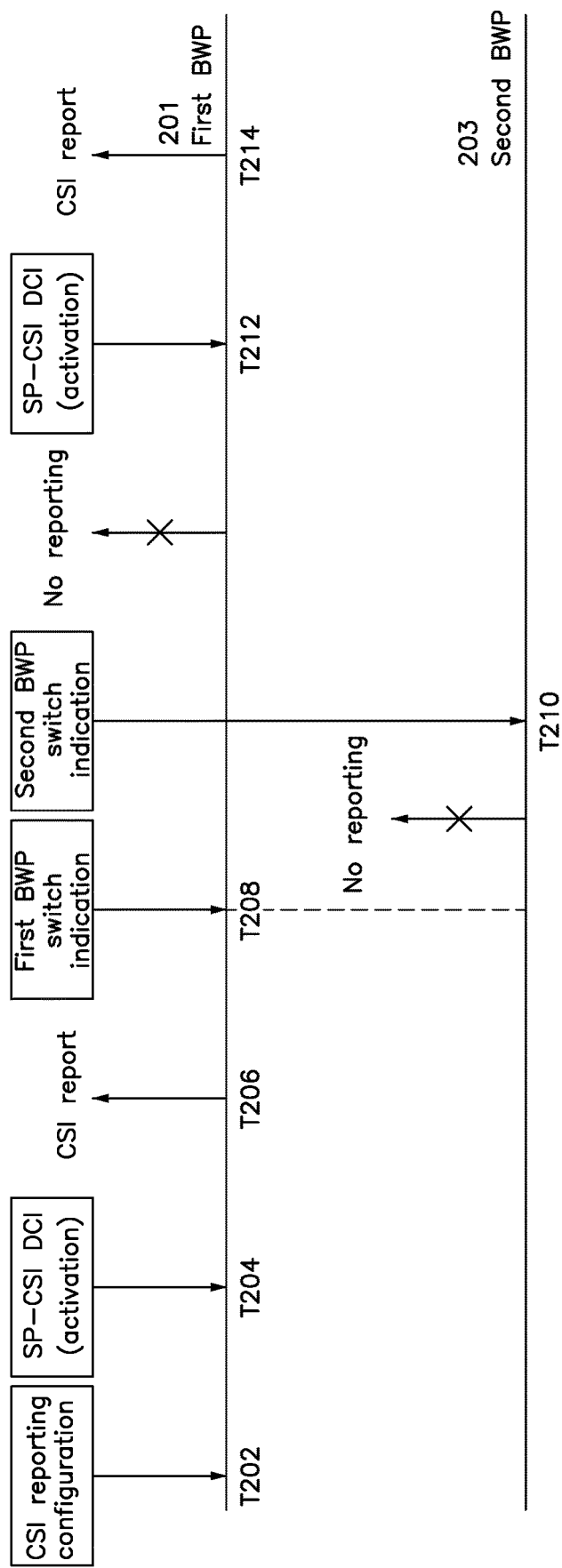
FIG. 2 is a schematic diagram illustrating that a BWP switch operation occurs when a UE is performing a CSI reporting procedure, in accordance with example implementations of the present disclosure.

FIG. 2 is a schematic diagram illustrating a BWP switch operation occurring when a UE is performing a CSI reporting procedure, in accordance with example implementations of the present disclosure.

As shown in FIG. 2, at time T202, the UE may receive, on the first BWP 201, a CSI reporting configuration from a base station via an RRC message (e.g., an RRC configuration message). The UE may then receive a CSI reporting activation command (e.g., (SP-CSI) DCI for activation) from the base station at time T204, and accordingly activate a CSI reporting procedure based on the received CSI reporting configuration.

While the CSI reporting procedure is activated, the UE may report CSI report(s) to the base station periodically. As shown in time T206, the UE may send a CSI report to the base station based on the CSI reporting configuration.

In the present implementation, the BWP switch operation may include the UE switching from a first BWP 201 to a second BWP 203, and then switching from the second BWP 203 back to the first BWP 201. As shown in FIG. 2, at time T208, the UE may receive a first BWP switch indication from the base station. The first BWP switch indication may be contained in (BWP) DCI. Upon receiving the first BWP switch indication, the UE may switch from its current active BWP (e.g., the first BWP 201) to the second BWP 203.

After the UE switches to the second BWP 203, the UE may deactivate the CSI reporting procedure. For example, when operated on the second BWP 203, the UE may stop transmitting the CSI report to the base station. It should be noted that in the present implementation, although the UE may deactivate the CSI reporting procedure when the UE switches to the second BWP 203, the UE may still reserve (e.g., not to release) the CSI reporting configuration. This way, the base station may activate the CSI reporting procedure using a later procedure.

At time T210, the UE may receive a second BWP switch indication from the base station. The second BWP switch indication (e.g., contained in (BWP) DCI) may indicate to the UE to switch the active BWP back to the first BWP 203. Hence, upon receiving the second BWP switch indication, the UE may switch its current active second BWP 203 back to the first BWP 201.

After the UE switches back to the first BWP 201, on which the CSI reporting configuration is received, the UE may keep the CSI reporting procedure deactivated until the UE receives a CSI reporting activation command in some of the present implementations. As shown in FIG. 2, after the UE receives a CSI reporting activation command (e.g., (SP-CSI) DCI for activation) from the base station at time T212, the UE may resume the CSI reporting procedure, and send a CSI report to the base station at time T214, based on the received CSI reporting configuration.

In some other implementations, the UE may release the CSI reporting configuration after the BWP switching operation is triggered. For example, the UE may deactivate the CSI reporting procedure and release the CSI reporting configuration in response to the reception of the first BWP switching indication. In some of such implementations, even if the UE's current active BWP (e.g., the second BWP 203) changes back to the BWP on which the CSI reporting procedure was previously activated (e.g., the first BWP 201), the CSI reporting procedure may not be resumed by a CSI reporting activation command.

It should be noted that although the BWP switch operation illustrated in FIG. 2 includes two BWP switches only, the present disclosure is not limited thereto. In various implementations of the present disclosure, the BWP switch operation may include several BWP switches. Furthermore, for a UE, the triggering condition of a BWP switch may not be limited to the reception of a BWP switch indication. In some of the present implementations, the triggering condition of a BWP switch may be the expiration of a specific timer, or any other predefined rule.

Figure 3:
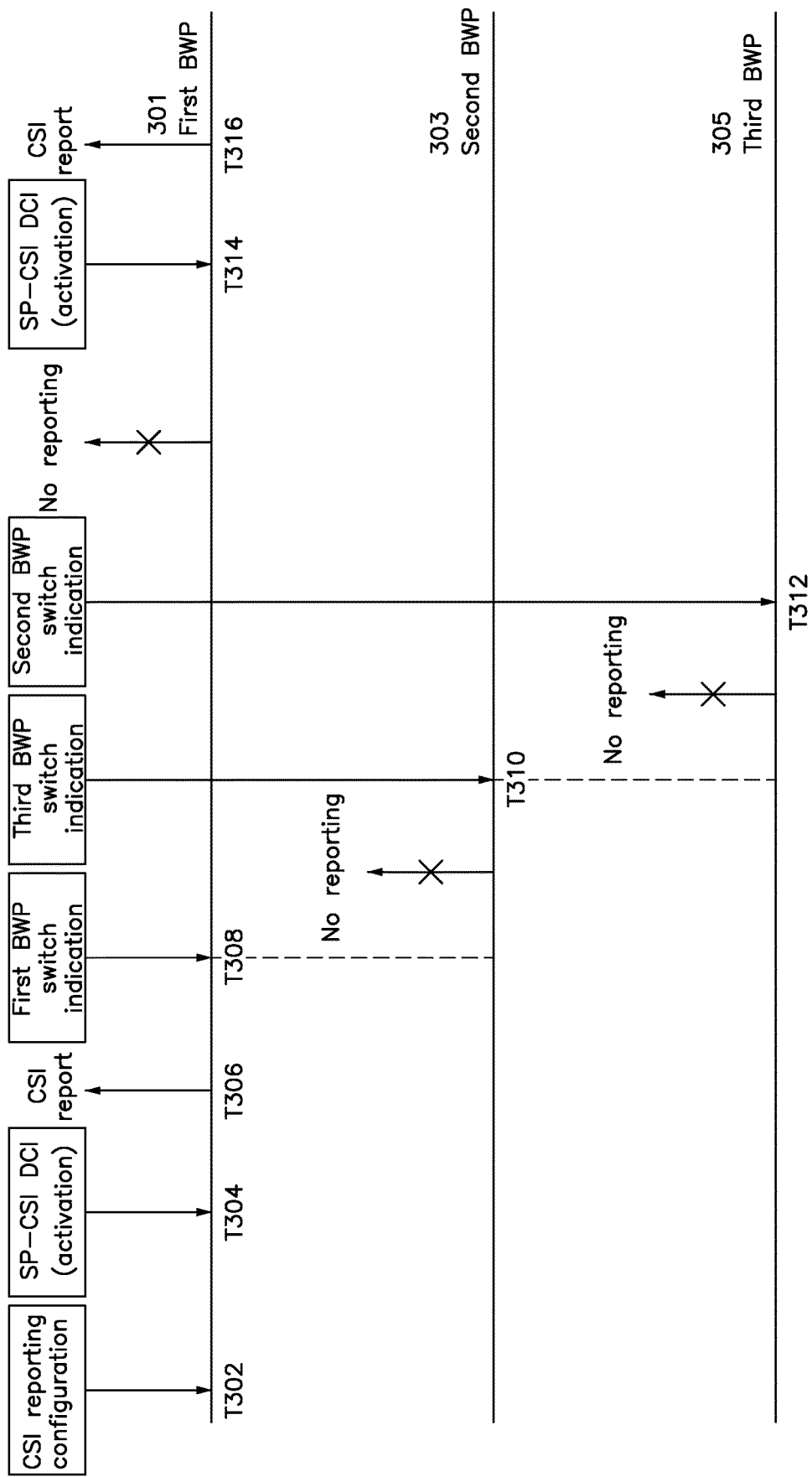
FIG. 3 is a schematic diagram illustrating that a BWP switch operation occurs when a UE is performing a CSI reporting procedure, in accordance with example implementations of the present disclosure.

FIG. 3 is a schematic diagram illustrating a BWP switch operation occurring when a UE is performing a CSI reporting procedure, in accordance with example implementations of the present disclosure. In the illustrated implementation, the BWP switch operation may include the UE switching from the first BWP 301 to the second BWP 303, then switching from the second BWP 303 to the third BWP 305, and then switching from the third BWP 305 back to the first BWP 301.

As shown in FIG. 3, at time T302, the UE may receive, on a first BWP 301, a CSI reporting configuration from a base station via an RRC message (e.g., the RRC configuration message). The UE may then receive a CSI reporting activation command (e.g., (SP-CSI) DCI for activation) from the base station at time T304, and accordingly activate a CSI reporting procedure configured by the CSI reporting configuration.

At time T306, the UE may send a CSI report to the base station based on the received CSI reporting configuration at time T302.

At time T308, the UE may receive a first BWP switch indication (e.g., contained in a DCI) from the base station, and switch from the first BWP 301 to a second BWP 303 according to the first BWP switch indication.

After the UE switches to the second BWP 303, the UE may deactivate the CSI reporting procedure. For example, when operated on the second BWP 303, the UE may stop transmitting a CSI report to the base station.

At time T310, the UE may receive a third BWP switch indication (e.g., contained in (BWP) DCI) from the base station that indicates to the UE to switch from the second BWP 303 to a third BWP 305.

While the UE is operating on the third BWP 305, the UE may keep the CSI reporting procedure deactivated.

At time T312, the UE may receive a second BWP switch indication (e.g., contained in (BWP) DCI) from the base station. The second BWP switch indication may indicate to the UE to switch from its current active BWP to the first BWP 301. Hence, upon receiving the second BWP switch indication, the UE may switch from the current active BWP (e.g., the third BWP 305) back to the first BWP 301.

In the present implementation, the UE may reserve the CSI reporting configuration during the BWP switch operation, so that the CSI reporting procedure may still be activated by the base station at a later time.

After the UE switches back to the first BWP 301, on which the CSI reporting configuration is received, the UE may keep the CSI reporting procedure deactivated until the UE receives a CSI reporting activation command from the base station. As shown in FIG. 3, after the UE receives the CSI reporting activation command (e.g., (SP-CSI) DCI for activation) from the base station at time T314, the CSI reporting procedure may be activated again. Hence, the UE may start sending, at time T316, a CSI report to the base station based on the CSI reporting configuration.

Figure 4:
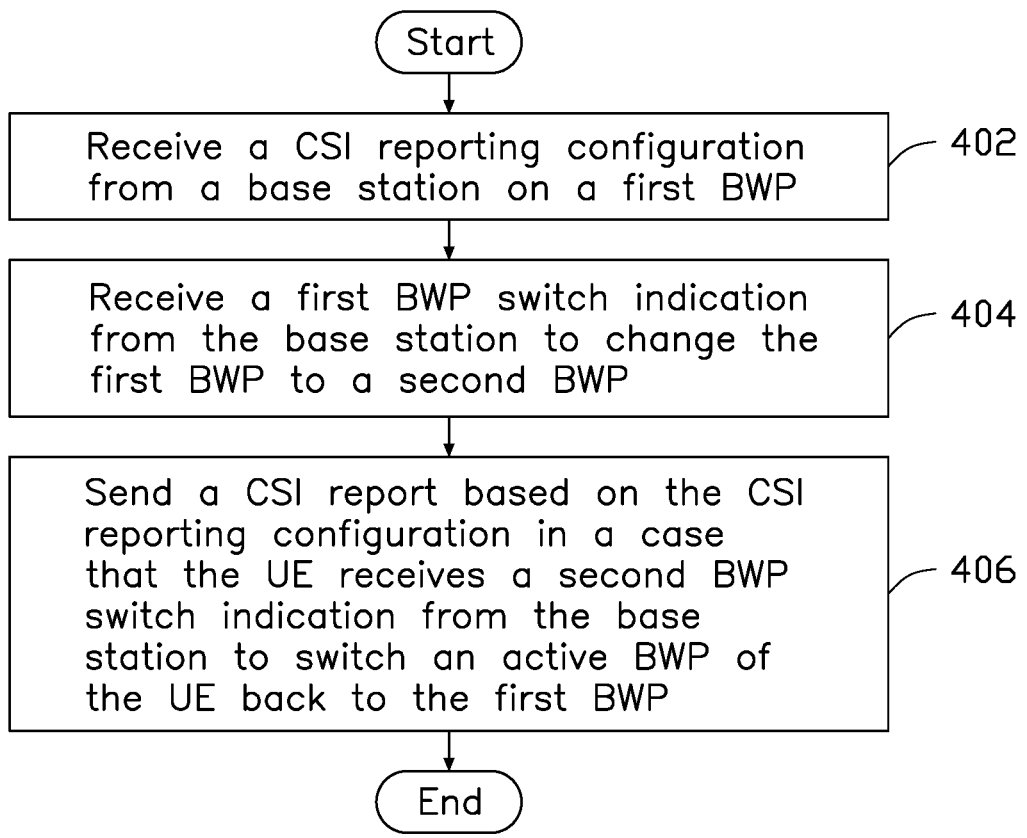
FIG. 4 illustrates a flowchart for a method of CSI reporting for a BWP switch operation, in accordance with example implementations of the present disclosure.

FIG. 4 illustrates a flowchart for a method of CSI reporting for a BWP switch operation, in accordance with example implementations of the present disclosure. As shown in FIG. 4, the flowchart includes actions 402, 404 and 406.

In action 402, a UE may receive a CSI reporting configuration from a base station on a first BWP. In some implementations, the CSI reporting configuration may be contained in an RRC message (e.g., an RRC configuration message) received from the base station. In some of such implementations, the RRC message may include a plurality of trigger states, and one of the plurality of trigger states may be associated with the CSI reporting configuration.

In action 404, the UE may receive a first BWP switch indication from the base station to change the first BWP to a second BWP.

In action 406, the UE may send a CSI report based on the CSI reporting configuration in a case that the UE receives a second BWP switch indication from the base station to switch from an active BWP of the UE back to the first BWP.

Figure 5:
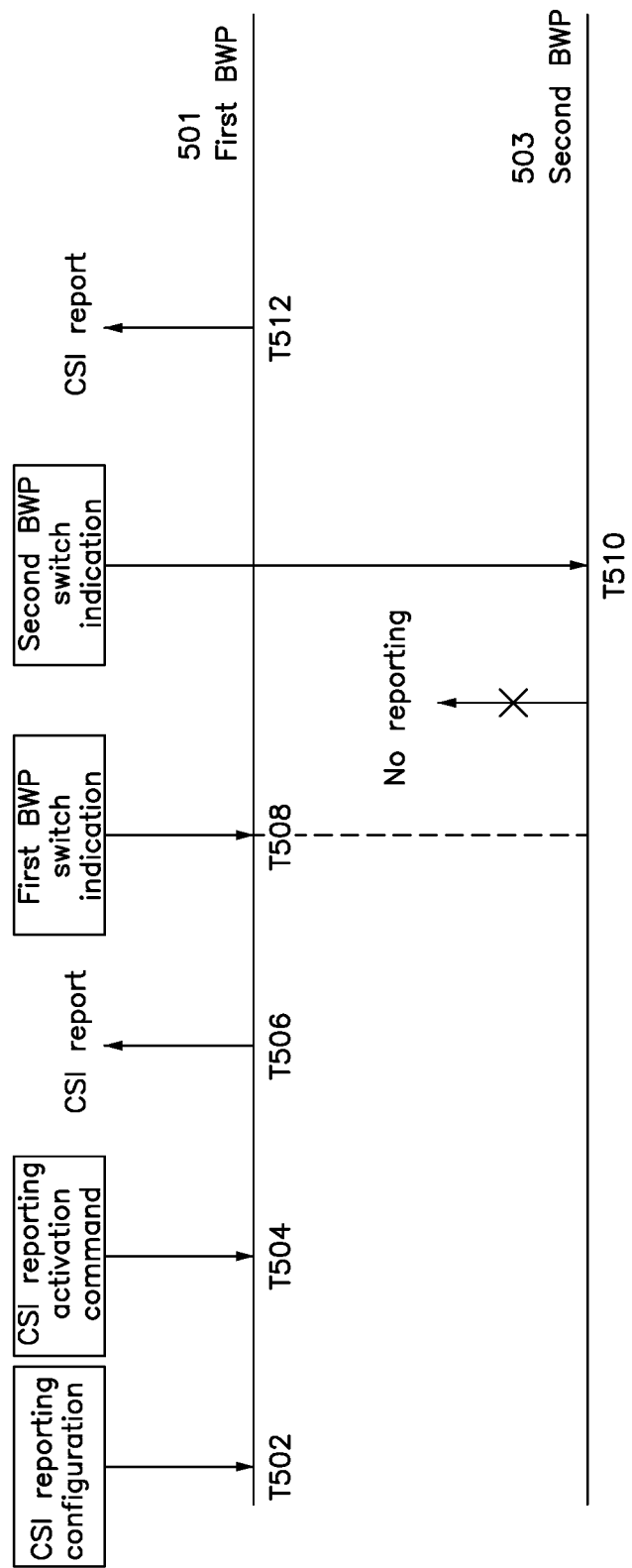
FIG. 5 is a schematic diagram illustrating that a BWP switch operation occurs when a UE is performing a CSI reporting procedure, in accordance with example implementations of the present disclosure.

FIG. 5 is a schematic diagram illustrating a BWP switch operation occurring when a UE is performing the CSI reporting procedure, in accordance with example implementations of the present disclosure.

As shown in FIG. 5, at time T502, the UE may receive, on a first BWP 501, a CSI reporting configuration from a base station via an RRC message (e.g., an RRC configuration message). The UE may then receive a CSI reporting activation command (e.g., (SP-CSI) DCI or a Medium Access Control (MAC) Control Element (CE) for activation)

from the base station at time T504, and accordingly activate a CSI reporting procedure based on the CSI reporting configuration.

While the CSI reporting procedure is activated, the UE may transmit one or more CSI reports to the base station periodically. As shown in the illustrated example, at time T506, the UE may send a CSI report to the base station based on the CSI reporting configuration (e.g., received at time T502).

In the illustrated implementation, the BWP switch operation includes the UE switching from the first BWP 501 to a second BWP 503, and then switching from the second BWP 503 back to the first BWP 501. As shown in FIG. 5, at time T508, the UE may receive a first BWP switch indication from the base station. Upon receiving the first BWP switch indication, the UE may switch from its current active BWP (e.g., the first BWP 501) to the second BWP 503.

After the UE switches to the second BWP 503, the UE may deactivate the CSI reporting procedure, and reserve the CSI reporting configuration.

At time T510, the UE may receive a second BWP switch indication (e.g., contained in (BWP) DCI) from the base station. Upon receiving the second BWP switch indication, the UE may switch from its current active BWP (e.g., the second BWP 503) back to the first BWP 501. As illustrated in FIG. 5, between time T508 (i.e., receiving the first switch indication) and time T510 (i.e., receiving the second switch indication), the UE does not transmit any CSI reports to the base station.

After the UE switches back to the first BWP 501, on which the CSI reporting configuration is received, the UE may automatically activate the CSI reporting procedure, without receiving any CSI reporting activation command. As shown in FIG. 5, once the UE is switched to the first BWP 501, the UE may automatically resume the CSI reporting procedure and send one or more CSI reports to the base station based on the CSI reporting configuration at time T512.

In some implementations, the CSI reporting procedure may be activated and deactivated by the base station multiple times with the same CSI reporting configuration, if the CSI reporting configuration is not reconfigured or released by the base station through an RRC message. Taking FIG. 5 as an example, after time T512, the base station may further deactivate the CSI reporting procedure by sending a CSI reporting deactivation command (e.g., (SP-CSI) DCI for deactivation) to the UE. After that, the base station may activate the CSI reporting procedure again by sending a CSI reporting activation command to the UE.

In some other implementations, the UE may release the CSI reporting configuration if the UE receives a CSI reporting deactivation command (e.g., (SP-CSI) DCI for deactivation) from the base station. Once the CSI reporting configuration is released, the CSI reporting procedure may not be resumed by a CSI reporting activation command again, if the UE is not configured with a new CSI reporting configuration.

In some other implementations, the UE may determine whether to release or reserve the CSI reporting configuration based on the characteristics of a particular BWP. In some such implementations, the characteristics of an associated BWP may include at least one of the following items: 1) the BWP being pair-spectrum or non-pair spectrum, 2) the BWP being operated at Frequency Range 1 (FR1) or Frequency Range 2 (FR2), and 3) the BWP's numerology. That is, different BWPs may behave differently after receiving the CSI reporting configuration and while the UE switches between the BWPs. In some other implementations, the response of each BWP after receiving the CSI reporting configuration may depend on the configuration received from the base station (e.g., a gNB).

Figure 6:
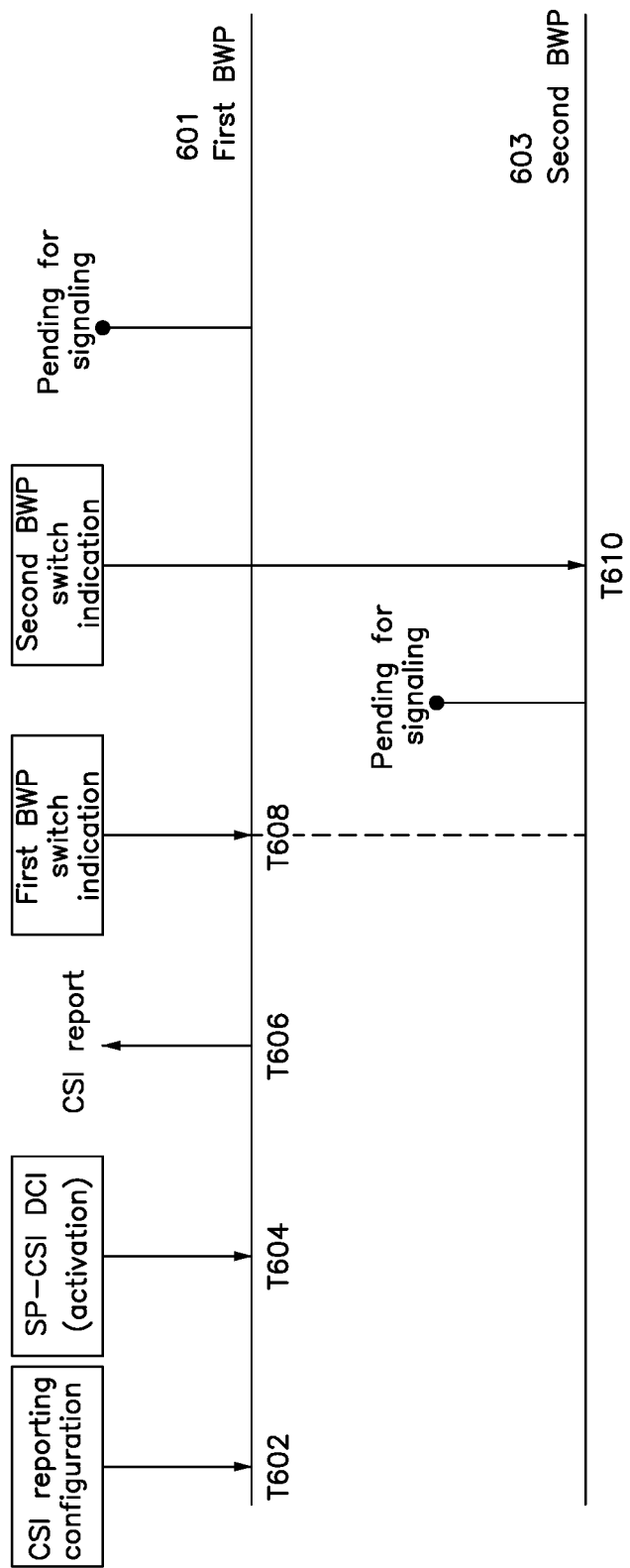
FIG. 6 is a schematic diagram illustrating that a BWP switch operation occurs when a UE is performing a CSI reporting procedure, in accordance with example implementations of the present disclosure.

FIG. 6 is a schematic diagram illustrating a BWP switch operation occurring when a UE is performing the CSI reporting procedure, in accordance with example implementations of the present disclosure. In the present implementation, the UE's behavior after a BWP switch may depend on an explicit signaling from a base station. The UE may reserve the CSI reporting configuration during the BWP switch operation, if the CSI reporting configuration is not released or reconfigured by the base station.

As shown in FIG. 6, at time T602, the UE may receive, on a first BWP 601, a CSI reporting configuration from the base station via an RRC message (e.g., an RRC configuration message). The UE may then receive a CSI reporting activation command (e.g., (SP-CSI) DCI for activation) from the base station at time T604, and accordingly activate a CSI reporting procedure configured by the CSI reporting configuration.

While the CSI reporting procedure is activated, the UE may transmit one or more CSI reports to the base station. As shown in FIG. 6, at time T606, the UE may send a CSI report to the base station based on the CSI reporting configuration.

In the illustrated implementation, the BWP switch operation includes the UE switching from the first BWP 601 to a second BWP 603, and then switching from the second BWP 603 back to the first BWP 601. As shown in FIG. 6, at time T608, the UE may receive a first BWP switch indication from the base station. Upon receiving the first BWP switch indication, the UE may switch from its current active first BWP 601 to the second BWP 603.

After the UE switches to the second BWP 603, the CSI reporting procedure may become pending until an explicit signaling is sent by the base station. For example, after the UE switches to the second BWP 603, the UE may reserve the CSI reporting configuration, and not perform any CSI measurement until the UE receives an explicit signaling from the base station. In some implementations, the explicit signaling may include the information about whether the UE should reserve the CSI reporting procedure on a new BWP (e.g., the second BWP 603 shown in FIG. 6) or not, and/or which CSI report setting(s) should be applied.

At time T610, the UE may receive a second BWP switch indication (e.g., contained in (BWP) DCI) from the base station. Upon receiving the second BWP switch indication, the UE may switch from its current active second BWP 603 to the first BWP 601.

After the UE switches back to the first BWP 601, the CSI reporting procedure may stay pending until the UE receives an explicit signaling from the base station.

Figure 7:
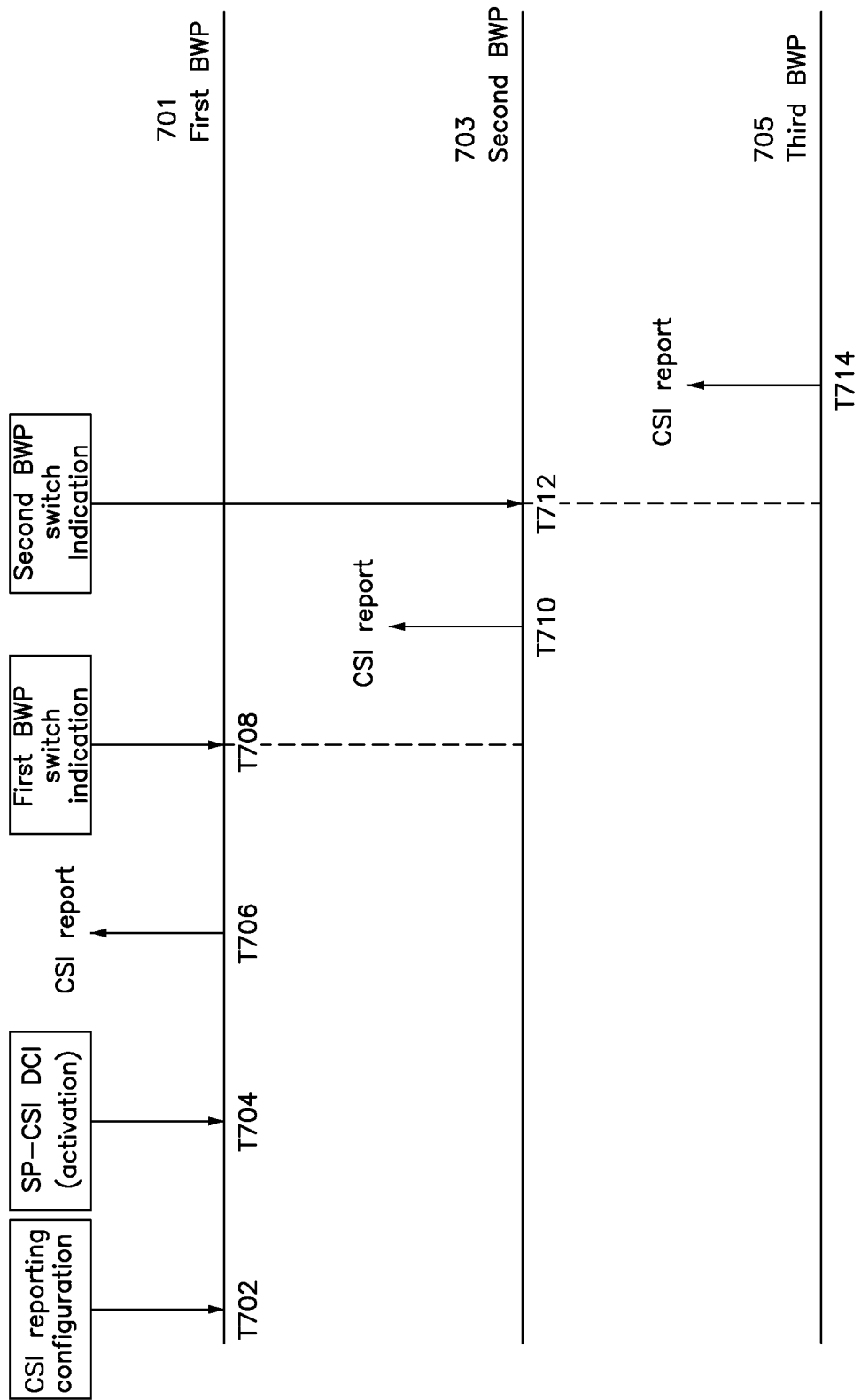
FIG. 7 is a schematic diagram illustrating that a BWP switch operation occurs when a UE is performing a CSI reporting procedure, in accordance with example implementations of the present disclosure.

FIG. 7 is a schematic diagram illustrating a BWP switch operation occurring when a UE is performing a CSI reporting procedure, in accordance with example implementations of the present disclosure. In the present implementation, the UE may be configured (e.g., by a base station) with one or more default CSI report settings for one or more BWPs. In some implementations, when the UE's active BWP is changed to a new BWP that is not configured with a CSI reporting configuration, the UE may apply the default CSI report settings on the new BWP to send the CSI report and/or other basic information. In some implementations, the default CSI report settings may be pre-determined without the RRC configuration, and may not be reconfigured later.

As shown in FIG. 7, at time T702, the UE may receive, on a first BWP 701, a CSI reporting configuration from the base station via an RRC message (e.g., an RRC configuration message). The UE may then receive a CSI reporting activation command (e.g., (SP-CSI) DCI for activation) from the base station at time T704, and accordingly activate a CSI reporting procedure based on the CSI reporting configuration.

At time T706, the UE may send a CSI report to the base station based on the CSI reporting configuration.

In the illustrated implementation, the BWP switch operation includes the UE switching from the first BWP 701 to a second BWP 703, then switching from the second BWP 703 to a third BWP 705, and then switching from the third BWP 705 back to the first BWP 701.

As shown in FIG. 7, at time T708, the UE may receive a first BWP switch indication (e.g., contained in (BWP) DCI) from the base station, and switch from the first BWP 701 to the second BWP 703 according to the first BWP switch indication.

After the UE switches to the second BWP 703, at time T710, the UE may send a CSI report to the base station based on a first default CSI report setting corresponding to the second BWP 703.

At time T712, the UE may receive a second BWP switch indication (e.g., contained in (BWP) DCI) from the base station that indicates to the UE to switch from the second BWP 703 to the third BWP 705.

After the UE is operated on the third BWP 705, at time T714, the UE may send a CSI report to the base station based on a second default CSI report setting corresponding to the third BWP 705. In some implementations, both of the first and second default CSI report settings may be preconfigured by the base station, or determined based on the UE's implementation.

Figure 8:
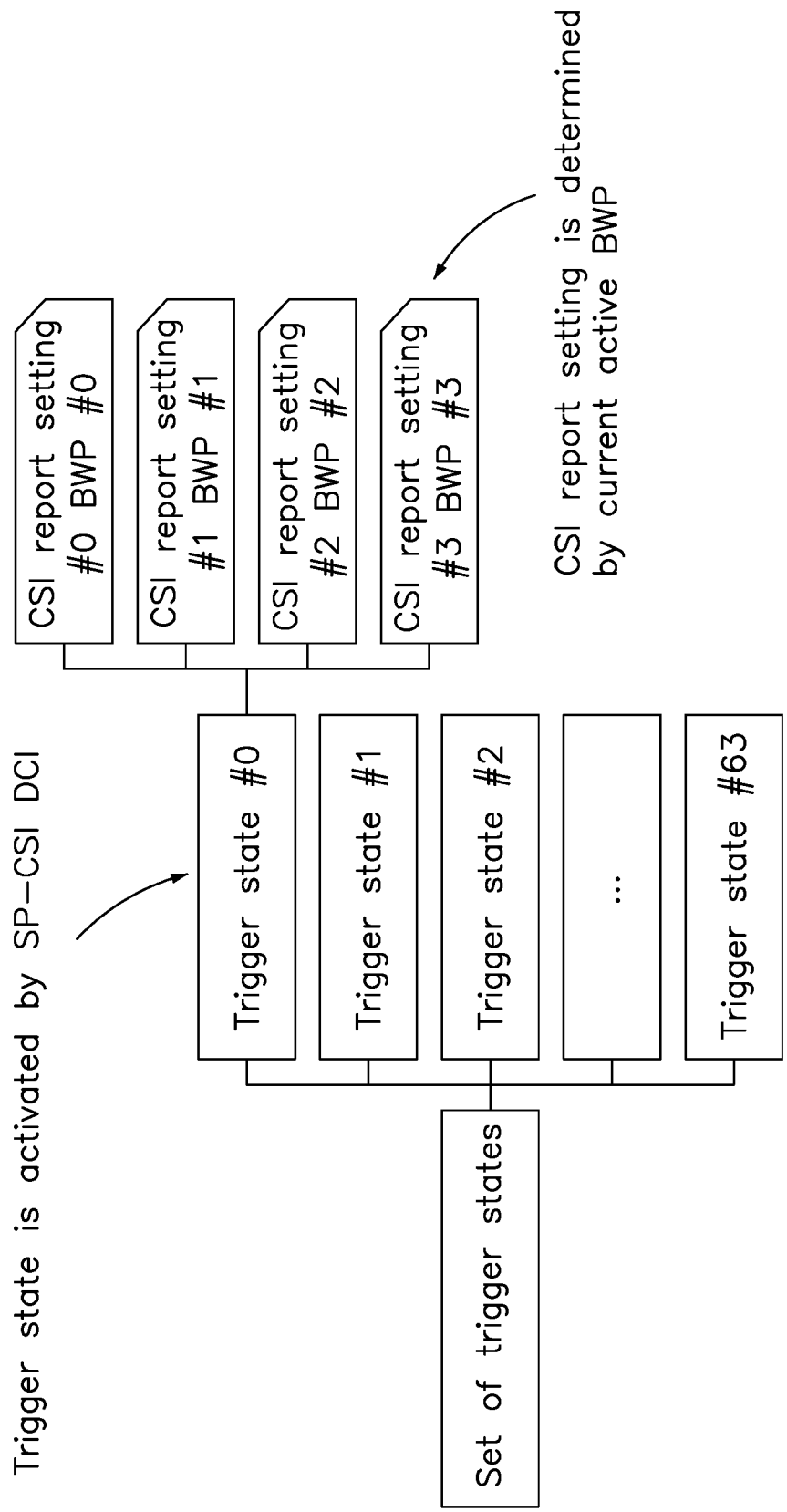
FIG. 8 shows a schematic diagram of a set of trigger states, in accordance with example implementations of the present disclosure.

FIG. 8 shows a schematic diagram of a set of trigger states 800, in accordance with example implementations of the present disclosure. In the present implementation, the set of trigger states 800 may be configured as a hierarchical format with multiple CSI report settings. As shown in FIG. 8, the set of trigger states 800 may include a plurality of trigger states (e.g., the trigger states #0, #1, . . . and #63). Each trigger state may include one or more CSI report settings. As shown in FIG. 8, the trigger state #0 may include four CSI report settings (e.g., the CSI report settings #0, #1, #2 and #3). In some implementations, each CSI report setting may be associated with one single (DL) BWP.

In some implementations, the base station may send a CSI reporting activation command (e.g., (SP-CSI) DCI for activation) to the UE to select and activate a trigger state (e.g., trigger state #0) in the set of trigger states 800. The CSI report setting (e.g., the CSI report setting #3) of the selected/activated trigger state may be determined by the current active BWP.

Figure 9:
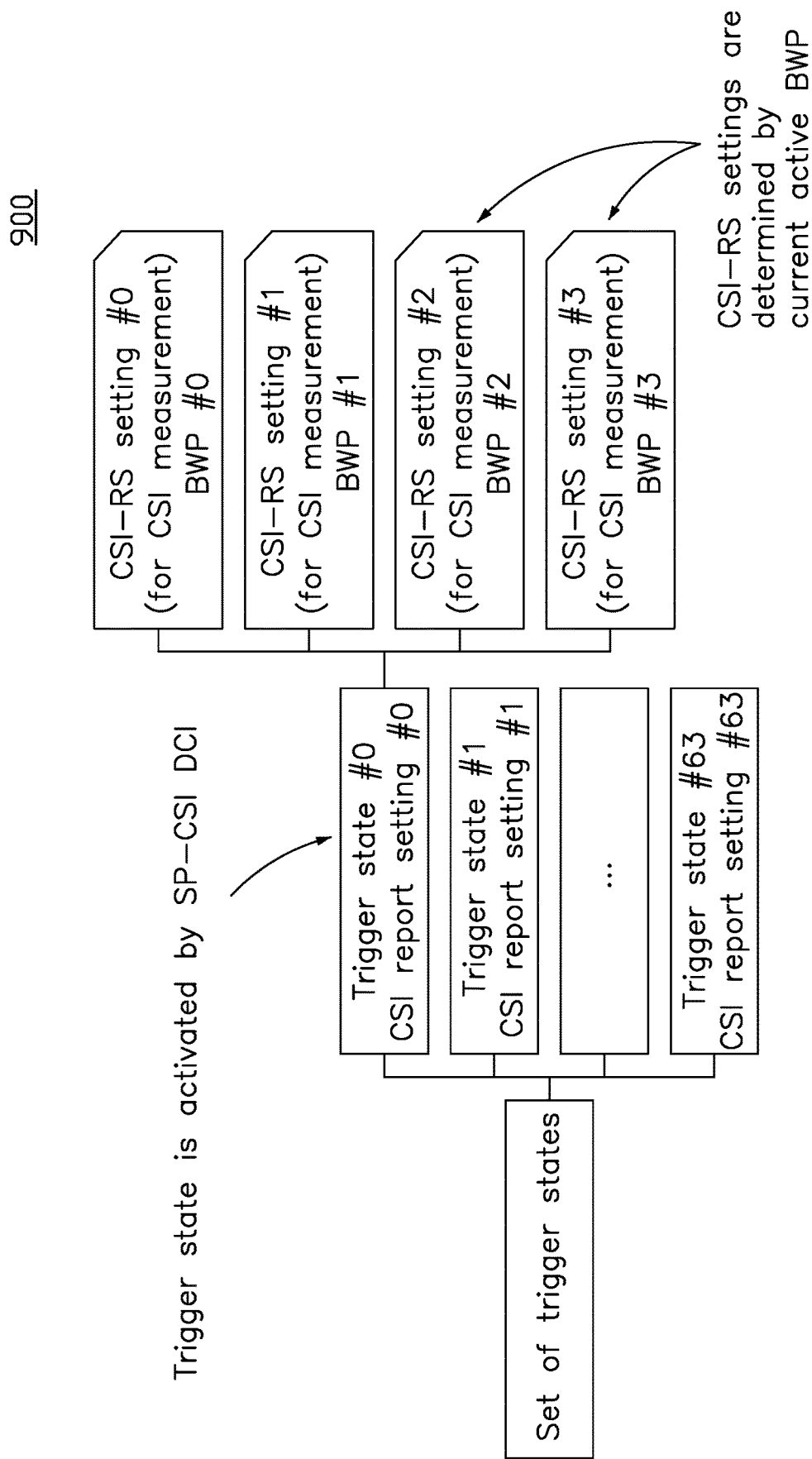
FIG. 9 shows a schematic diagram of a set of trigger states, in accordance with example implementations of the present disclosure.

FIG. 9 shows a schematic diagram of a set of trigger states 900, in accordance with example implementations of the present disclosure. In the present implementation, the set of trigger states 900 may be configured as a hierarchical format using multiple CSI Resource (CSI-RS) settings. As shown in FIG. 9, the set of trigger states 900 may include a plurality of trigger states (e.g., trigger states #0, #1, . . . and #63). Each trigger state may include only one CSI report setting. For example, the trigger state #0 may include the CSI report setting #0, the trigger state #1 may include the CSI report setting #1, and so on. Each CSI report setting may have one or more CSI-RS settings. As shown in FIG. 9, the CSI report setting #0 may have multiple CSI-RS settings #0, #1, #2 and #3. In some implementations, each CSI-RS setting may be associated with one DL BWP ID. The DL BWP ID may be configured by (BWP) DCI.

In some implementations, the base station may send a CSI reporting activation command (e.g., (SP-CSI) DCI for activation) to the UE to select and activate a trigger state in the set of trigger states 900. The selected trigger state (e.g., the trigger state #0) may be associated with a CSI report setting (e.g., the CSI report setting #0) having one or more CSI-RS settings (e.g., the CSI-RS settings #0, #1, #2, and #3). The CSI-RS settings may be determined by the current active BWP.

Figure 10:
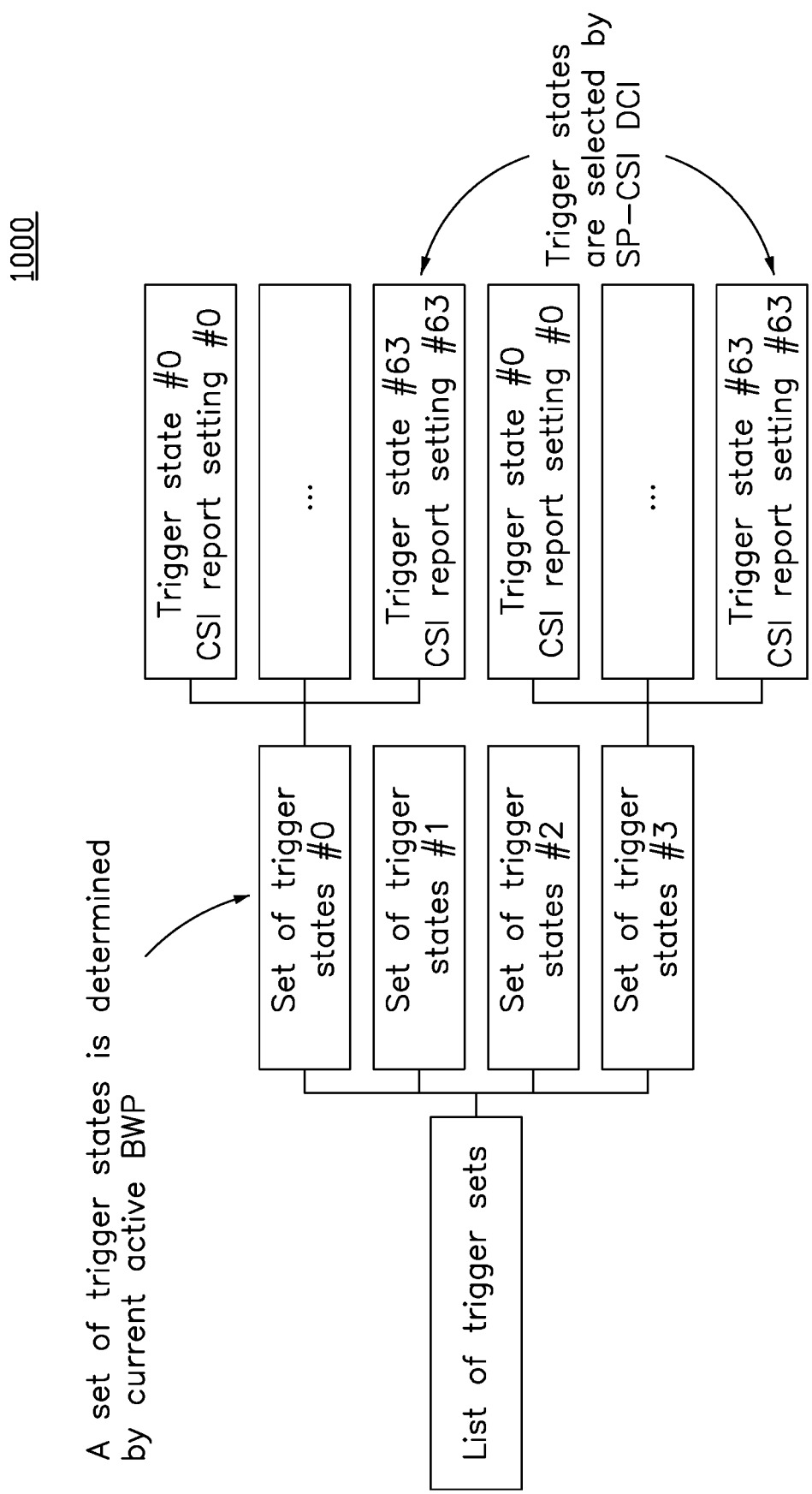
FIG. 10 shows a schematic diagram of a list of trigger sets, in accordance with example implementations of the present disclosure.

FIG. 10 shows a schematic diagram of a list of trigger sets 1000, in accordance with example implementations of the present disclosure. In the present implementation, one or more sets of trigger states (e.g., the sets of trigger states #0, #1, #2 and #3, shown in FIG. 10) may be collected in a list of trigger sets (e.g., the list of trigger sets 1000). Each set of trigger states may be configured per BWP ID and include one or more CSI report settings (e.g., the CSI report settings #0, #1, . . . , and #63).

In some implementations, the base station may send a CSI reporting activation command (e.g., (SP-CSI) DCI for activation) to the UE to select multiple trigger states among all sets of trigger states. In some of such implementations, only one set of trigger states (e.g., the set of trigger states #0) may be determined by the current active BWP. As a result, only one trigger state (e.g., the trigger states #63) may be chosen by the UE according to the selection of the CSI reporting activation command and the current BWP ID.

In some implementations, if the UE switches the active BWP, the UE may change the set of trigger states accordingly. In some of such implementations, by default, the same trigger state (e.g., if the trigger states #22 is selected for the previous active BWP) may be applied in the new active BWP. In some implementations, the UE may apply (cross-BWP SP-CSI) DCI from the base station. For example, when the UE receives the (SP-CSI) DCI at the BWP #0, if the BWP ID is appended (e.g., the ID of BWP #2), the UE may apply the selected trigger state in the assigned BWP, followed by the CSI reporting configuration.

In some implementations, if multiple active BWPs are considered, the base station may use the respective (SP-CSI) DCI to select the trigger state. In some such implementations, the UE may apply (cross-BWP SP-CSI) DCI from the base station. For example, when UE receives the (SP-CSI) DCI at the BWP #0, if the BWP ID is appended (e.g., the ID of BWP #2), the UE may apply the selected trigger state in the assigned BWP, followed by the CSI reporting configuration.

Figure 11:
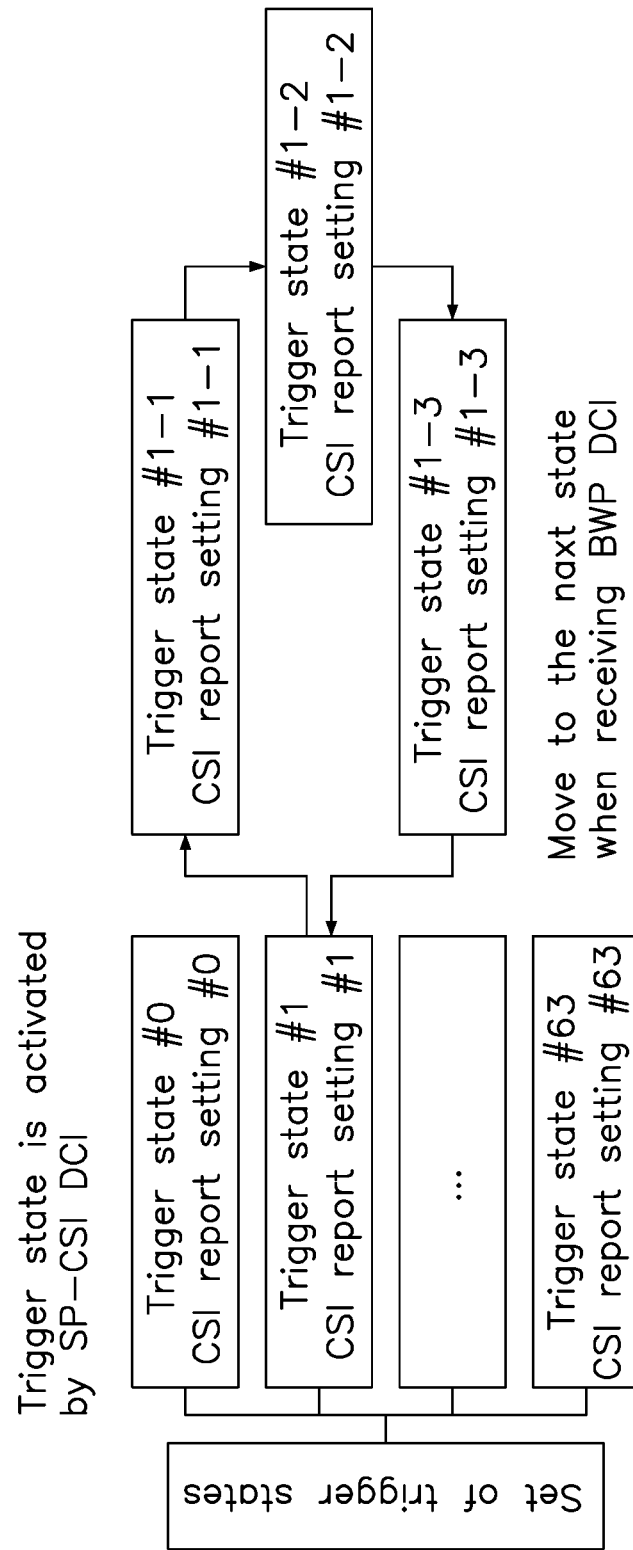
FIG. 11 shows a schematic diagram of a set of trigger states, in accordance with example implementations of the present disclosure.

FIG. 11 shows a schematic diagram of a set of trigger states 1100, in accordance with example implementations of the present disclosure. In the present implementation, the set of trigger states 1100 may be configured as a state machine, and the BWP switch operation may have a specific BWP switch pattern (e.g., BWP #0→BWP #1→BWP #2→BWP #3→BWP #4→BWP #0).

In some implementations, the set of trigger states (e.g., the set of trigger states 1100) may be preconfigured for the specific BWP switch pattern. As shown in FIG. 11, the trigger state #1 may be configured with additional trigger states #1-1, #1-2 and #1-3 for the subsequent BWP switch. Each trigger state may contain a CSI report setting. As shown in FIG. 11, the CSI report settings #0, #1, . . . and #63 may be corresponding to the trigger states #0, #1, . . . and

63, respectively. The CSI report settings #1-1, #1-2 and #1-3 may be corresponding to the trigger states #1-1, #1-2 and #1-3, respectively.

In some implementations, the base station may send (SP-CSI) DCI to the UE to activate a trigger state. In some of such implementations, the activated trigger state may be changed by (BWP) DCI according to a predetermined BWP ID order.

Figure 12:
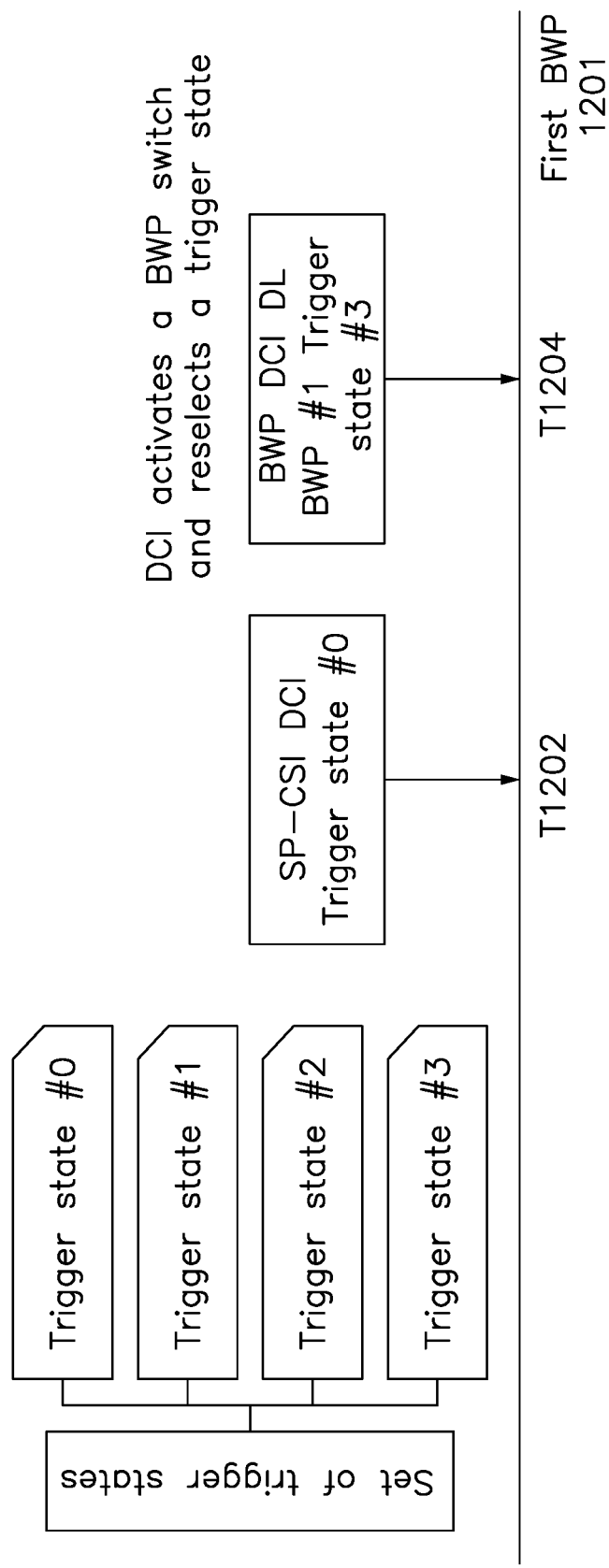
FIG. 12 is a schematic diagram illustrating a base station sending (BWP) Downlink Control Information (DCI) to a UE for a BWP switch operation, in accordance with example implementations of the present disclosure.

FIG. 12 is a schematic diagram illustrating a base station sending (BWP) DCI to a UE for a BWP switch operation, in accordance with example implementations of the present disclosure. In the present implementation, the (BWP) DCI may be configured with an additional trigger field for a trigger state. For example, the trigger field may include (or be associated with) a new trigger state ID from a set of trigger states that is preconfigured by an RRC message.

In some implementations, the (BWP) DCI may trigger a BWP switch and reselect a new trigger state. As shown in FIG. 12, the UE is preconfigured with multiple trigger states #0, #1, #2 and #3 by the base station, e.g., through an RRC message. At time T1202, the base station may send (SP-CSI) DCI to the UE to activate one of the preconfigured trigger states (e.g., the trigger state #0). After that, at time T1204, the base station may change the activated trigger state (e.g., the trigger state #0) to another preconfigured trigger state (e.g., the trigger state #3) by the (BWP) DCI. The (BWP) DCI may further indicate to the UE to switch the active BWP from the first BWP 1201 to an indicated BWP (e.g., the BWP #1).

Figure 13:
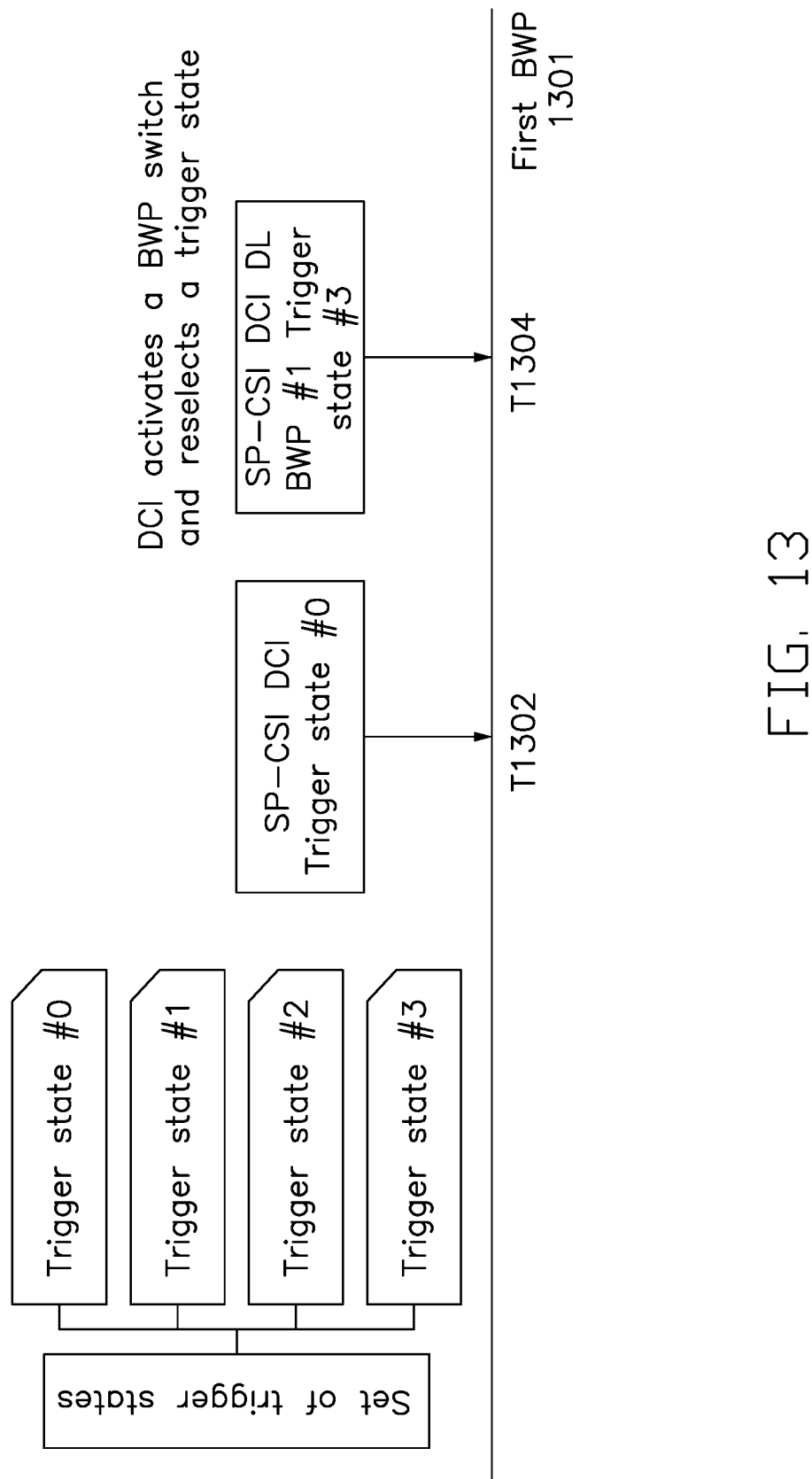
FIG. 13 is a schematic diagram illustrating a base station sending (BWP) DCI to a UE for a BWP switch operation, in accordance with example implementations of the present disclosure.

FIG. 13 is a schematic diagram illustrating a base station sending (BWP) DCI to a UE for a BWP switch operation, in accordance with example implementations of the present disclosure. In the present implementation, the (SP-CSI) DCI may be configured with a BWP ID that may trigger a BWP switch.

As shown in FIG. 13, the UE is preconfigured with multiple trigger states #0, #1, #2 and #3 by the base station, e.g., through an RRC message. At time T1302, the base station may send (SP-CSI) DCI to the UE to activate one of the preconfigured trigger states (e.g., the trigger state #0). After that, at time T1304, the base station may change the activated trigger state (e.g., the trigger state #0) to another preconfigured trigger state (e.g., the trigger state #3) by a specific (SP-CSI) DCI. In the present implementation, the specific (SP-CSI) DCI may further trigger a BWP switch. As a result, as shown in FIG. 13, the specific (SP-CSI) DCI may indicate to the UE to switch the active BWP from the first BWP 1301 to the BWP #1, and change the trigger state #0 to a new trigger state #3.

In some implementations, one trigger state may be activated by the specific (SP-CSI) DCI, and this trigger state may be changed to a new trigger state by the specific (SP-CSI) DCI with or without a BWP switch.

In some other implementations, whether the UE performs the SP-CSI reporting procedure and/or dropping on a new active BWP may depend on the characteristics of a BWP. In some such implementations, the characteristics of the associated BWP may include at least one of the following: 1) the BWP being pair-spectrum or non-pair spectrum, 2) the BWP being operated at FR1 or FR2, and 3) the BWP's numerology. That is, different BWPs may apply different treatments upon the preconfigured trigger states while the UE switches to another BWP. Another approach is the treatment toward the pre-configured trigger state upon each BWP is configured by the base station. In some implementations, after a BWP switch, the SP-CSI reporting procedure continues to either reporting or dropping.

Figure 14:
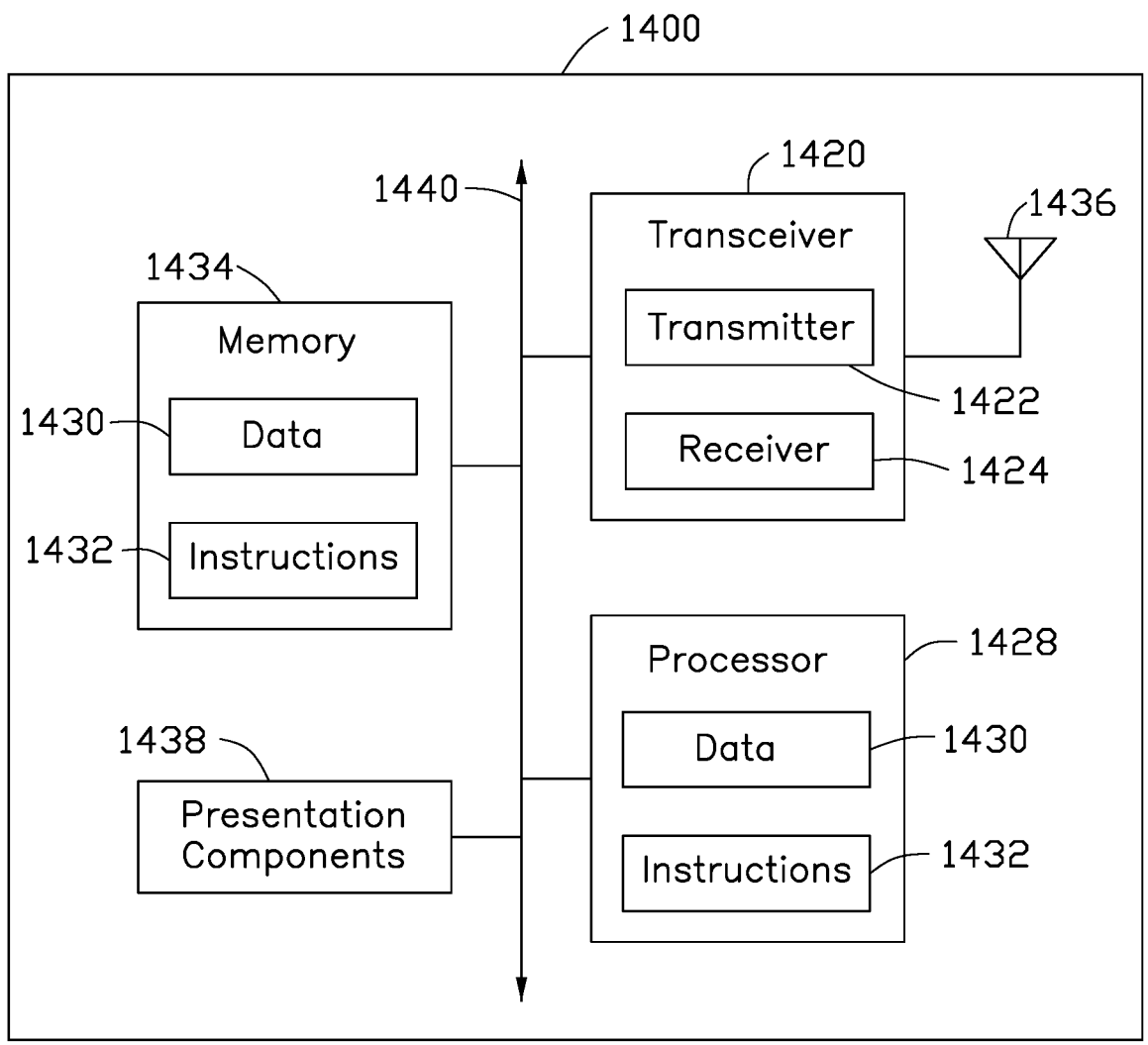
FIG. 14 illustrates a block diagram of a node for wireless communication, in accordance with various aspects of the present disclosure.

FIG. 14 illustrates a block diagram of a node for wireless communication, in accordance with various aspects of the present application. As shown in FIG. 14, a node 1400 may include a transceiver 1420, a processor 1428, a memory 1434, one or more presentation components 1438, and at least one antenna 1436. The node 1400 may also include a Radio Frequency (RF) spectrum band module, a base station communications module, a network communications module, and a system communications management module, input/output (I/O) ports, I/O components, and power supply (not explicitly shown in FIG. 14). Each of these components may be in communication with each other, directly or indirectly, over one or more buses 1440. In one implementation, the node 1400 may be a UE or a base station that performs various functions described herein, for example, with reference to FIGS. 1 through 13.

The transceiver 1420 having a transmitter 1422 (e.g., transmitting/transmission circuitry) and a receiver 1424 (e.g., receiving/reception circuitry) may be configured to transmit and/or receive time and/or frequency resource partitioning information. In some implementations, the transceiver 1420 may be configured to transmit in different types of subframes and slots including, but not limited to, usable, non-usable and flexibly usable subframes and slot formats. The transceiver 1420 may be configured to receive data and control channels.

The node 1400 may include a variety of computer-readable media. Computer-readable media can be any available media that can be accessed by the node 1400 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 1434 may include computer-storage media in the form of volatile and/or non-volatile memory. The memory 1434 may be removable, non-removable, or a combination thereof. Exemplary memory includes solid-state memory, hard drives, optical-disc drives, and etc. As illustrated in FIG. 14, The memory 1434 may store computer-readable, computer-executable instructions 1432 (e.g., software codes) that are configured to, when executed, cause the processor 1428 to perform various functions described herein, for example, with reference to FIGS. 1 through 13. Alternatively, the instructions 1432 may not be directly executable by the processor 1428 but be configured to cause the node 1400 (e.g., when compiled and executed) to perform various functions described herein.

The processor 1428 (e.g., having processing circuitry) may include an intelligent hardware device, e.g., a central processing unit (CPU), a microcontroller, an ASIC, and etc. The processor 1428 may include memory. The processor 1428 may process the data 1430 and the instructions 1432 received from the memory 1434, and information through the transceiver 1420, the base band communications module, and/or the network communications module. The processor 1428 may also process information to be sent to the transceiver 1420 for transmission through the antenna 1436, to the network communications module for transmission to a core network.

One or more presentation components 1438 presents data indications to a person or other device. Exemplary presentation components 1438 include a display device, speaker, printing component, vibrating component, and etc.

From the present disclosure, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method performed by a User Equipment (UE) for reporting Channel State Information (CSI), the method comprising:
   receiving a CSI reporting configuration from a base station (BS) on a first Bandwidth Part (BWP);
   receiving a first BWP switch indication from the BS on the first BWP;
   switching an active BWP of the UE from the first BWP to a second BWP according to the first BWP switch indication;
   reserving the CSI reporting configuration after switching the active BWP;
   receiving a second BWP switch indication on the second BWP or a third BWP after switching the active BWP of the UE to the second BWP;
   switching the active BWP of the UE back to the first BWP according to the second BWP switch indication;
   after switching the active BWP of the UE back to the first BWP, automatically sending a CSI report based on the CSI reporting configuration without receiving any CSI reporting activation command from the BS;
   receiving a third BWP switch indication on the second BWP after switching the active BWP of the UE;
   switching the active BWP of the UE to the third BWP according to the third BWP switch indication;
   receiving the second BWP switch indication on the third BWP; and
   switching the active BWP of the UE to the first BWP according to the second BWP switch indication.

2. The method of claim 1, wherein the CSI reporting configuration is received in a Radio Resource Control (RRC) message from the BS.

3. The method of claim 2, wherein the RRC message comprises a plurality of trigger states, a trigger state of the plurality of trigger states being associated with the CSI reporting configuration.

4. The method of claim 3, further comprising:
   receiving a CSI reporting activation command on the first BWP before receiving the first BWP switch indication from the BS, the CSI reporting activation command comprising an indication of the trigger state of the plurality of trigger states.

5. A User Equipment (UE) for reporting Channel State Information (CSI), the UE comprising:
   at least one memory storing a set of instructions; and
   at least one processor coupled to the at least one memory, the at least one processor configured to execute the set of instructions to:
   receive a CSI reporting configuration from a base station (BS) on a first Bandwidth Part (BWP);
   receive a first BWP switch indication from the BS on the first BWP;
   switch an active BWP of the UE from the first BWP to a second BWP according to the first BWP switch indication;
   reserve the CSI reporting configuration after switching the active BWP of the UE;
   receive a second BWP switch indication on the second BWP or a third BWP after switching the active BWP of the UE to the second BWP;
   switch the active BWP of the UE back to the first BWP according to the second BWP switch indication;
   after switching the active BWP of the UE back to the first BWP, automatically send a CSI report based on the CSI reporting configuration without receiving any CSI reporting activation command from the BS;
   receive a third BWP switch indication on the second BWP after switching the active BWP of the UE;
   switch the active BWP of the UE to the third BWP according to the third BWP switch indication;
   receive the second BWP switch indication on the third BWP; and
   switch the active BWP of the UE to the first BWP according to the second BWP switch indication.

6. The UE of claim 5, wherein the CSI reporting configuration is received in a Radio Resource Control (RRC) message from the BS.

7. The UE of claim 6, wherein the RRC message comprises a plurality of trigger states, a trigger state of the plurality of trigger states being associated with the CSI reporting configuration.

8. The UE of claim 7, wherein the at least one processor is further configured to execute the set of instructions to:
   receive a CSI reporting activation command on the first BWP before receiving the first BWP switch indication from the BS, the CSI reporting activation command comprising an indication of the trigger state of the plurality of trigger states.

* * * * *